United States Patent [19]

Derra et al.

[11] Patent Number: 5,262,701
[45] Date of Patent: Nov. 16, 1993

[54] CIRCUIT ARRANGEMENT FOR OPERATING A HIGH PRESSURE SODIUM LAMP

[75] Inventors: Günther Derra, Grevenbroich; Hans-Günther Ganser; Hans-Peter Stormberg, both of Stolberg, all of Fed. Rep. of Germany

[73] Assignee: U.S. Philips Corporation, New York, N.Y.

[21] Appl. No.: 834,026

[22] Filed: Feb. 11, 1992

[30] Foreign Application Priority Data

Mar. 15, 1991 [NL] Netherlands .................... 9100458

[51] Int. Cl.⁵ ............... H05B 41/29; H05B 41/39
[52] U.S. Cl. ............................. 315/224; 315/226; 315/307
[58] Field of Search ............... 315/209 R, 224, 226, 315/246, 291, 307

[56] References Cited

U.S. PATENT DOCUMENTS

| | | | |
|---|---|---|---|
| 4,137,484 | 1/1979 | Osteen | 315/209 R |
| 4,485,336 | 11/1984 | Yoshiyama et al. | 315/152 X |
| 5,004,349 | 4/1991 | Sato et al. | 315/151 X |

FOREIGN PATENT DOCUMENTS

0439863 8/1991 European Pat. Off. .
0439864 8/1991 European Pat. Off. .

*Primary Examiner*—David Mis
*Attorney, Agent, or Firm*—Edward Blocker

[57] ABSTRACT

The invention relates to a dimming circuit arrangement for operating a high-pressure sodium lamp L with controllable color temperature. The lamp is supplied with current pulses having a controllable duty cycle D. A change in the color temperature can be achieved through a change $\Delta D$ in the duty cycle D and a simultaneous change $\Delta P$ in the power supplied to the lamp, while the relation $\Delta D/\Delta P > 0$ is satisfied.

4 Claims, 3 Drawing Sheets

CIRCUIT ARRANGEMENT FOR OPERATING A HIGH PRESSURE SODIUM LAMP

BACKGROUND OF THE INVENTION

The invention relates to a circuit arrangement for operating a high-pressure sodium lamp with a controllable colour temperature $T_c$ in which a power P is supplied to the lamp through current pulses having a current value I and a duty cycle D, whereby a change in the colour temperature $T_c$ is achieved through a change $\Delta D$ of the duty cycle.

A conventional circuit arrangement, such as disclosed in U.S. Pat. No. 4,137,484 varies the colour temperature $T_c$ of light radiated by a high pressure to sodium lamp between approximately 2,000 K. and approximately 2,900 K., provided the power P supplied the lamp is constant. In other words, a change in the duty cycle $\Delta D$ must be accompanied by a corresponding change in the current value $\Delta I$, where the relation $\Delta I/\Delta D < 0$ is satisfied. Colour temperature variation from 2,000 K. to 2,900 K. results in a decrease of approximately 20% in the luminous flux radiated by the lamp. Such a decrease in the luminous flux although perceptible by the human eye is too small to effectively serve as a dimmer for the lamp. For dimming purposes a practical dimming facility the luminous flux should controllably range between a ratio of at least 1:4, preferably 1:5. Conventional circuit arrangements, however, cannot provide such ratios without current rising to an unacceptable level. There is also a risk of colour temperature $T_c$ falling well below 2,000 K. for high luminous flux values. A colour temperature of 2,000 K. or less, is generally less desirable for applications other than public lighting.

SUMMARY OF THE INVENTION

It is therefore an object of the invention, inter alia to provide a circuit arrangement for dimming a high-pressure sodium lamp and at the same time to realize a colour temperature $T_c$ above 2.000 K.

According to the invention, the circuit arrangement is characterized by the change in the duty cycle $\Delta D$ being accompanied by a change $\Delta P$ in the power supplied to the lamp, for which it is true that $\Delta D/\Delta P > 0$.

The inventors have found that, with a circuit arrangement according to the invention, the luminous flux of a high-pressure sodium lamp which radiates white light under rated operating conditions is controllable between limits with a ratio of at least 1:4, while the light radiated by the lamp has a colour temperature $T_c$ which varies in the range from 2,000 K. to more than 3,000 K. An increase in luminous flux is accompanied by a higher colour temperature $T_c$. This is an advantage, since this corresponds to a relation between luminous flux and colour temperature which is generally perceived to be pleasant by the human eye.

Preferably, the current I and the duty cycle D in a circuit arrangement according to the invention satisfy the relation $$I = a - bD,$$

in which a and b are constants. An advantage is that a linear, i.e. a very simple relation between the current I and the duty cycle D renders it possible to realize practically applicable dimming range with a corresponding range of variations in the colour temperature $T_c$. The values of the constants a and b are chosen based on this relationship between current I and duty cycle D. For the constant a, it is advantageous to choose the value between $L_{eff}$ and $4I_{eff}$, in which $I_{eff}$ is the effective current value through the lamp at rated operating conditions on a normal AC voltage supply source of 50 to 60 Hz. Power consumption of the lamp during short duration of current pulses should not lead to acoustic resonance for small values of D in choosing the value of $4I_{eff}$ which generally serves as an applicable limit for the value of constant a. In the case of a value for a equalling $I_{eff}$, a desirable dimming range can be achieved including the case in which b=0. Increasing the value of b above 0 leads to a wider range of current I over which the luminous flux may be varied and also to possible adjustment of the accompanying colour temperature range. As the value of b is increased, the dimming range is reduced. For values of b above $3I_{eff}$, desirable dimmer can be practically realized.

Although the desired dimming range is preferably based on the relation $I = a - bD$, a suitable dimming range can also be achieved when the relation $\Delta I/\Delta D > 0$ is satisfied. This leads to a relatively small range within which the duty cycle can be varied, at least for a linear relation between current and duty cycle and imposes more stringent requirements on the circuit arrangement.

Preferably, duty cycle D should have a minimum value of 0, 1 it being emperically determined that a relatively high risk of extinguishing of the lamp exists for smaller values of the duty cycle D.

BRIEF DESCRIPTION OF THE DRAWINGS

An embodiment of a circuit arrangement according to the invention will be explained in more detail below with reference to the drawings, in which.

DETAILED DESCRIPTION OF THE PREFERRED EMBODIMENT

Figure 1:
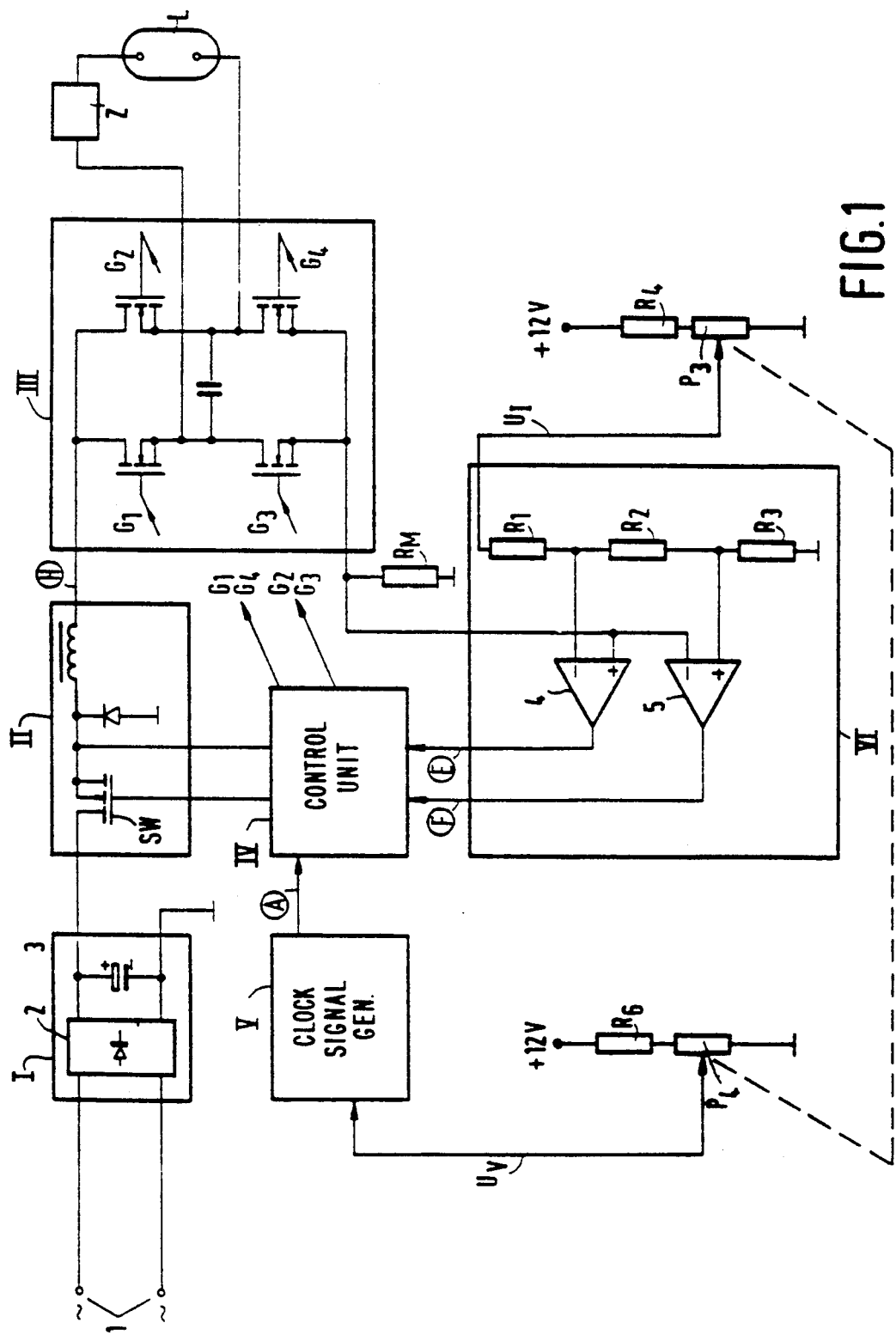
FIG. 1 is a schematic of the circuit arrangement.

In FIG. 1, lamp L provided with a starter Z is included in a branch of a converter unit III comprising four semiconductor switches G1, G2, G3, G4. The semiconductor switches G1 to G4 are so controlled with a repetition frequency by a control unit IV that switches G1 and G4 are switched into a conductive state while switches G2 and G3 are non-conducting, and vice versa, alternately. In this manner a periodic polarity change of voltage across and current through the lamp is realized. converter unit III is supplied with voltage pulses H, having a repetition frequency associated with the repetition frequency of control unit IV. The voltage pulses H have a controllable duty cycle D. The voltage pulses H are generated in a downconverter II which is connected to a supply source via a rectifier network I with connection terminals 1. Downconverter II is also controlled by control unit IV. Clock pulses I for driving the control unit IV are supplied by a clock signal generator V. The clock signal generator V generates clock pulses having a fixed frequency and a varying pulse width based on control voltage $U_v$. The instantaneous lamp current is measured by a measuring resistor $R_m$ and compared with an upper and a lower limit of an adjustable average current reference $U_I$ within a comparator unit VI. Comparator unit VI includes a pair of comparators 4, 5 and a voltage divider circuit having three resistors $R_1$, $R_2$, $R_3$. Output signals E and F of the comparators 4 and 5, respectively, effect the switching time of a switch SW high-freqiency do downconverter II, and thus the voltage pulses H, via the control unit IV. Lamp current can therefore be regulated.

A linear relation between pulse height and duty cycle of the voltage pulses H supplied to the lamp by the downconverter II is achieved through coupling of current reference $U_I$ and a control voltage $U_v$. Current reference $U_I$ is produced based on a voltage divider circuit $R_4$ and a potentiometer $P_3$ wherein current reference $U_I$ represents the current flowing through a tap of potentiometer $P_3$. Control voltage $U_v$ is produced based on a voltage divider network of resistor $R_6$ and a potentiometer $P_4$ wherein control voltage $U_v$ represents the voltage at a tap of potentiometer $P_4$. Potentiometers $P_3$, $P_4$ share a common adjustment member for positioning their respective taps.

Characteristics were measured for a large number of discharge lamps, i.e. the colour temperature $T_c$ and the luminous flux for various values of duty cycle D and the current value I. The discharge lamps were of the Philips brand SDW 35 W type. The average rated lamp power was 35 W with an average rated effective current of 0,45 A.

Figure 2:
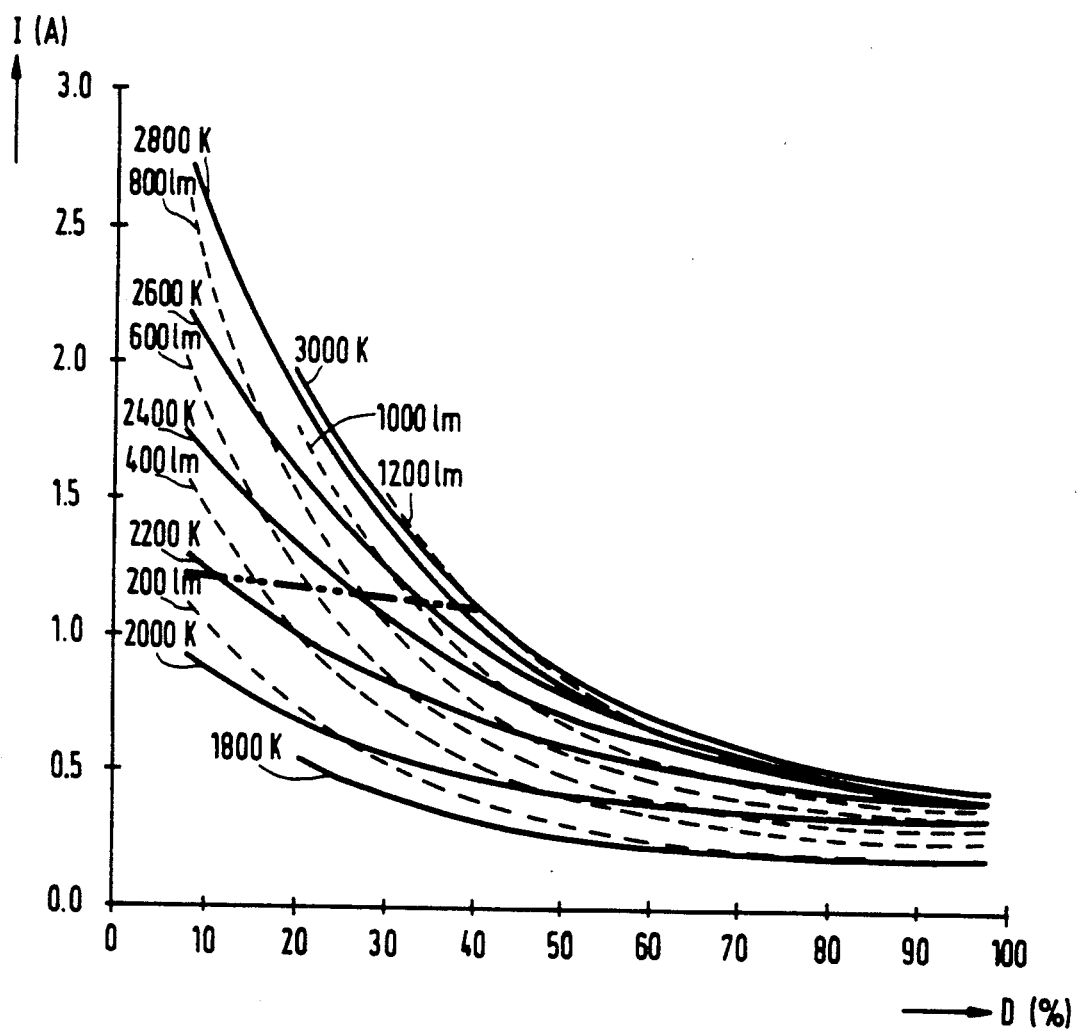
FIG. 2 illustrates lamp characteristics.

The results are shown in FIG. 2, where broken lines give the characteristics for constant luminous flux and full lines the characteristics for constant colour temperature $T_c$. The duty cycle D is plotted on the horizontal axis in % and the current I in (A) on the vertical axis. A dash-dot line defines the relation $I = a - bD$ with $a = 1.25$ A and $b = 0.35$ A. The characteristics relate to average values, the measuring accuracy for the colour temperature $T_c$ being approximately 50 K.

As can be readily appreciated from FIG. 2, a considerably wide range of current I and duty cycle D values are available in providing the desired level of dimming and includes a range of current I lying between 0.5 A and 2 A and a range of duty cycle D lying between 10% and 90%. It is equally apparent from FIG. 2 that a dimming range can also be achieved for which the relation $\Delta I/\Delta D > 0$ is satisfied in the case of a duty cycle D ranging between 10% and approximately 40%.

Component value for the circuit arrangement of FIG. 1 can be chosen so as to satisfy the relation between I and D as defined in FIG. 2 with a having the value 1.25 A and b having the value of 0.35 A.

The values of both a luminous flux $\Phi$ and of a colour temperature $T_c$ of light emitted by the lamp were measured based on the duty cycle D. Accompanying values of the current and of the power supplied to the lamp were also measured.

Figure 3:
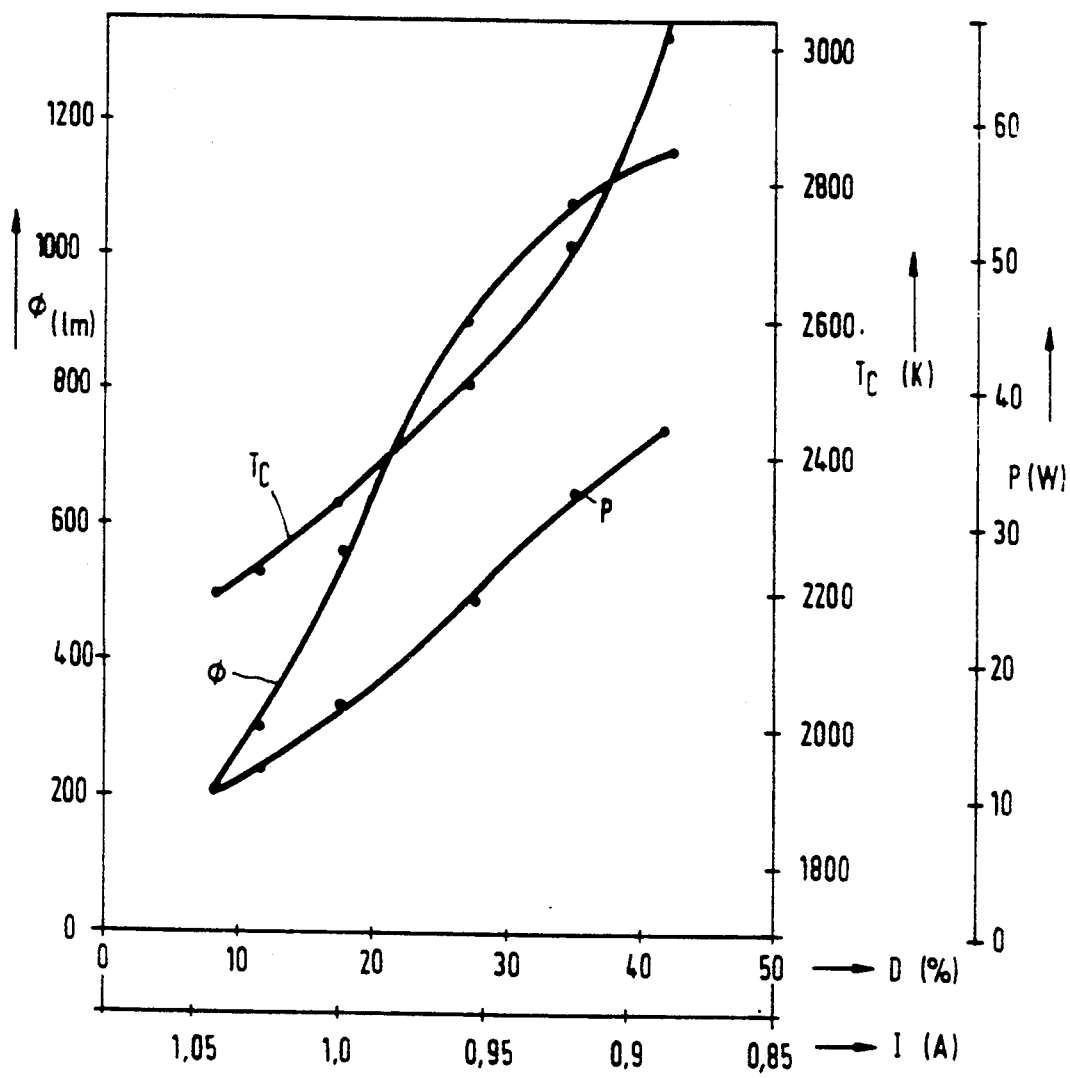
FIG. 3 plots test results of a lamp based on the circuit arrangement of FIG. 1.

The test results of luminous flux $\Phi$, color temperature $T_c$, lamp current I and duty cycle D are shown in the graph of FIG. 3. The duty cycle D in % and the current I in A are plotted on the horizontal axis, and the colour temperature $T_c$, the luminous flux $\Phi$ in lumens (lm) and the power P supplied to the lamp in coatts (W) are plotted along the vertical axis. The graph illustrates that the colour temperature $T_c$ varies from 2,200 K. to above 3,000 K. over a luminous flux range from 250 lm to 1,150 lm. The power supplied to the lamp varies from approximately 10 W to 35 W. The duty cycle D was a minimum of 10% to prevent lamp extinguishment arising from an excessive rise in the re-ignition voltage. A change in color temperature $T_c$ therefore can be achieved through a change in the duty cycle $\Delta D$ of the current pulses supplied to the lamp in which a change in duty cycle $\Delta D$ is accompanied by a change in power $\Delta P$ supplied to the lamp wherein $\Delta D/\Delta P > 0$.

Small differences found between the results plotted in FIG. 3 and the values for the colour temperature $T_c$ and the luminous flux $\Phi$ which can be read from FIG. 2, are due to inaccuracies inherent in the measurements and based on variations in lamp characteristics among individual lamps.

As can now be readily appreciated, the invention provides for variation in color temperature of light radiated by the high pressure sodium lamp between about 2000° K. and 2900° K. without requiring power supplied to the lamp be maintained at a relatively constant value. The circuit arrangement in accordance with the invention results in the human eye perceiving a change in the level of light radiated by the high pressure sodium lamp while maintaining the color temperature $T_c$ within a suitable operating range (i.e., between about 2000° K. and about 2900° K.). Furthermore, high luminous flux values can be achieved while maintaining color temperature $T_c$ at least 2000° K., that is, suitable for public lighting application.

It will thus be seen that the objects set forth above, among those made apparent from the preceding description, are efficiently attained and since certain changes can be made in carrying out the above circuit arrangement without departing from the spirit and scope of the invention, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language, might be said to fall therebetween.

We claim:

1. A circuit for operating a high-pressure sodium lamp having a controllable color temperature $T_c$, comprising a source of power P supplied to the lamp, said source of power including means for producing current pulses having a current I and a duty cycle D in which a change in duty cycle $\Delta D$ is accompanied by a change in power $\Delta P$ supplied to the lamp wherein $\Delta D/\Delta P > 0$ and such that the human eye can perceive a change in the level of light radiated by the lamp while maintaining the color temperature $T_c$ within a suitable operating range of the lamp.

2. The circuit arrangement of claim 1, characterized in that the current I and the duty cycle D satisfy the relation $$I = a - bD,$$

in which a and b are constants.

3. The circuit arrangement of claim 2, wherein $T_c$ varies from about 2000° K. to about 2900° K.

4. The circuit arrangement of claim 1, wherein $T_c$ varies from about 2000° K. to about 2900° K.

* * * * *